Figure 1:
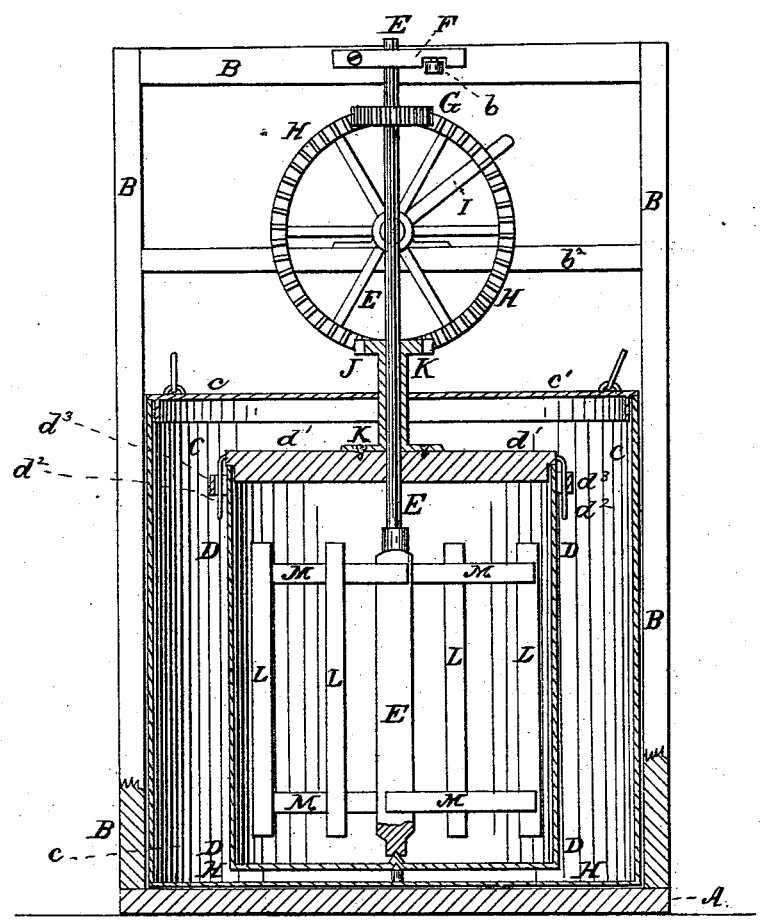

GARLOCH & RICHARDS.

Ice-Cream Freezer.

No. 82,509. Patented Sept. 29, 1868.

Witnesses:
Wm. A. Morgan
G. C. Cotton

Inventors:
Wm. A. Garloch
W. D. Richards
per Munn & Co.
Attorneys

United States Patent Office.

WILLIAM A. GARLOCH AND WILLIAM D. RICHARDS, OF BELPRE, OHIO.

Letters Patent No. 82,509, dated September 29, 1868.

IMPROVED ICE-CREAM FREEZER.

The Schedule referred to in these Letters Patent and making part of the same.

TO ALL WHOM IT MAY CONCERN:

Be it known that we, WILLIAM A. GARLOCH and WILLIAM D. RICHARDS, of Belpre, in the county of Washington, and State of Ohio, have invented a new and useful Combined Ice-Cream Freezer and Churn; and we do hereby declare that the following is a full, clear, and exact description thereof, which will enable others skilled in the art to make and use the same, reference being had to the accompanying drawings, forming a part of this specification.

The figure is a side view of our improved machine, partly in section, to show the construction.

Our invention has for its object to furnish an improved machine, simple in construction and effective in operation, and which may be used with equal facility for freezing ice-cream and churning, as may be desired; and it consists in the construction and combination of the various parts of the machine, as hereinafter more fully described.

A is a platform upon which the body of the machine stands, and to which is attached an upright frame, B, to support the gearing. C is the outer body or vessel, which stands upon the platform A, where it may be secured in place, when adjusted, by buttons attached to said platform.

The vessel C is provided with a removable cover, $c'$, made in two parts, so that it may be removed wholly or in part, to obtain access to said vessel without detaching the gearing. To the centre of the bottom of the vessel C is attached a pivot, which enters a socket in the centre of the bottom of the inner vessel, D, so as to pivot the said inner vessel, D, in the centre of the outer vessel, C. The inner vessel, D, is made so much smaller than the outer vessel, C, as to leave a space between said vessels, as shown in the drawing, to receive the freezing-mixture when the machine is used as an ice-cream freezer, and to receive hot or cold water to temper the cream when the machine is used as a churn.

E is the dasher-shaft, the lower end of which has a socket formed in it, to receive a pivot attached to the centre of the bottom of the inner vessel D, as shown in the figure. The dasher-shaft E passes up through the centre of the cover, $d$, of the inner vessel, D, through the centre of the cover $c'$ of the outer vessel, C, and enters a notch or bearing in the upper cross-bar, $b^1$, of the frame B, where it is secured in place by the catch F, as shown in the drawing.

To the upper end of the shaft E is attached a small bevel-gear wheel, G, into the teeth of which mesh the teeth of the large bevel-gear wheel K, the shaft of which revolves in bearings in the lower cross-bar, $b^2$, of the frame B.

To the outer end of the shaft of the gear-wheel H is attached the crank I, by which the machine is operated.

J is a small bevel-gear wheel, the teeth of which mesh into the teeth of the gear-wheel H. The small gear-wheel J is attached to the upper end of the sleeve K, through which the dasher-shaft E passes, and the lower end of which is attached to the cover $d^1$ of the vessel D. The cover $d^1$ of the vessel D has ears, $d^2$, attached to it, which enter keepers $d^3$, attached to the upper sides of the body of said vessel, so that the said vessel may be carried around in one direction by the revolution of the small gear-wheel J, at the same time that the dasher is carried around in the opposite direction by the action of the other small gear-wheel, G, the two bevel-gear wheels, J and G, being made to revolve in opposite directions by the same wheel, H.

The dasher-wings are formed by attaching one or more upright bars, L, to two horizontal bars, M, the inner ends of which are securely attached to the lower part of the dasher-shaft E. The inner ends of the upper horizontal bars, M, are attached to one side of the shaft E, and the inner ends of the lower horizontal bars, M, are attached to the other side of said shaft, so as to give to the said wings a slightly-inclined position.

In using the machine as an ice-cream freezer, the cream to be frozen is placed in the inner vessel, D, and the space between the inner vessel, D, and the outer vessel, C, is filled with the freezing-mixture. The two vessels are then adjusted upon the platform A, and the crank is turned until the cream is properly frozen.

In using the machine as a churn, the cream to be churned is placed in the inner vessel, D, and the two vessels placed upon the platform A. Then, by operating the crank I, the churning will be done in a very short time. Hot or cold water, as required to temper the cream, is poured into the outer vessel, C. If desired, when churning, the outer vessel, C, need not be used, its place being supplied by a board of the proper thickness, placed upon the platform A, and having a pivot attached to it, upon which may be pivoted the vessel D; but in this case it will be necessary for the hot or cold water, to temper the cream, to be poured into said cream in the vessel D. For this reason we prefer to always use both the outer and inner vessels.

Having thus described our invention, what we claim as new, and desire to secure by Letters Patent, is—

The sleeve K, secured to the cover of the inner case, and having formed upon its upper end the pinion J, said sleeve being supported in position to operate the inner case by the continuous dasher-shaft only, as herein shown and described.

WILLIAM A. GARLOCH,
WILLIAM D. RICHARDS.

Witnesses:
J. M. STONE,
LORING E. STONE.